(12) United States Patent
Kim et al.

(10) Patent No.: US 11,321,883 B2
(45) Date of Patent: May 3, 2022

(54) METHOD FOR PREVENTING DISPLAY BURN-IN IN ELECTRONIC DEVICE, AND ELECTRONIC DEVICE

(71) Applicant: Samsung Electronics Co., Ltd., Suwon-si (KR)

(72) Inventors: Seonghyun Kim, Suwon-si (KR); Namho Kim, Suwon-si (KR); Hoyoung Lee, Suwon-si (KR); Seongbeom Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/263,874

(22) PCT Filed: Jul. 25, 2019

(86) PCT No.: PCT/KR2019/009251
§ 371 (c)(1),
(2) Date: Jan. 27, 2021

(87) PCT Pub. No.: WO2020/022806
PCT Pub. Date: Jan. 30, 2020

(65) Prior Publication Data
US 2021/0327103 A1    Oct. 21, 2021

(30) Foreign Application Priority Data
Jul. 27, 2018    (KR) .................. 10-2018-0087881

(51) Int. Cl.
*G06T 11/00*    (2006.01)
*G06T 7/13*    (2017.01)
(Continued)

(52) U.S. Cl.
CPC .............. *G06T 11/001* (2013.01); *G06T 3/40* (2013.01); *G06T 7/13* (2017.01); *G06T 7/90* (2017.01); *G06T 2207/10024* (2013.01)

(58) Field of Classification Search
CPC combination set(s) only.
See application file for complete search history.

(56) References Cited

U.S. PATENT DOCUMENTS

| 8,203,551 B2 * | 6/2012 | Plut | G06F 1/3265 |
| | | | 345/211 |
| 2005/0195280 A1 * | 9/2005 | Murakami | G09G 3/007 |
| | | | 348/173 |

(Continued)

FOREIGN PATENT DOCUMENTS

| JP | 2005-031931 A | 2/2005 |
| KR | 10-2007-0025292 A | 3/2007 |

(Continued)

OTHER PUBLICATIONS

International Search Report dated Oct. 30, 2019 in connection with International Patent Application No. PCT/KR2019/009251, 2 pages.

(Continued)

*Primary Examiner* — Wesner Sajous

(57) ABSTRACT

Various embodiments relate to an electronic device and, according to one embodiment, the electronic device comprises a display and a processor, wherein the processor can be configured to detect at least one outline corresponding to at least one graphic object included in a first image to be displayed through the display, generate a second image in which the at least one outline has been adjusted to a first designated color and areas excluding the at least one outline in a first image have been adjusted to a second designated color, and display the second image by using the display. Other additional embodiments are possible.

13 Claims, 18 Drawing Sheets

(51) Int. Cl.
*G06T 7/90* (2017.01)
*G06T 3/40* (2006.01)

(56) References Cited

U.S. PATENT DOCUMENTS

| | | | | |
|---|---|---|---|---|
| 2008/0072151 A1* | 3/2008 | Song | ................... | G06F 3/0481 |
| | | | | 715/708 |
| 2010/0007656 A1* | 1/2010 | Okamoto | ............ | G09G 3/3233 |
| | | | | 345/214 |
| 2010/0068122 A1* | 3/2010 | Sung | ....................... | B01J 3/065 |
| | | | | 423/446 |
| 2015/0371579 A1* | 12/2015 | Yu | ....................... | G09G 3/2003 |
| | | | | 345/690 |
| 2016/0217770 A1 | 7/2016 | Kang et al. | | |
| 2017/0116915 A1 | 4/2017 | Song et al. | | |
| 2020/0005716 A1* | 1/2020 | Tan | ..................... | G09G 3/3291 |
| 2020/0068122 A1* | 2/2020 | Jang | ....................... | G06T 7/254 |

FOREIGN PATENT DOCUMENTS

| | | |
|---|---|---|
| KR | 10-2015-0045748 A | 4/2015 |
| KR | 10-2016-0078748 A | 7/2016 |
| KR | 10-2017-0003217 A | 1/2017 |
| KR | 10-2017-0003856 A | 1/2017 |
| KR | 10-2017-0049241 A | 5/2017 |

OTHER PUBLICATIONS

Written Opinion of the International Searching Authority dated Oct. 30, 2019 in connection with International Patent Application No. PCT/KR2019/009251, 5 pages.

* cited by examiner

METHOD FOR PREVENTING DISPLAY BURN-IN IN ELECTRONIC DEVICE, AND ELECTRONIC DEVICE

CROSS-REFERENCE TO RELATED APPLICATIONS

This application is a 371 of International Application No. PCT/KR2019/009251 filed on Jul. 25, 2019, which claims priority to Korean Patent Application No. 10-2018-0087881 filed on Jul. 27, 2018, the disclosures of which are herein incorporated by reference in their entirety.

BACKGROUND

1. Field

Various embodiments relate to a display of an electronic device.

2. Description of the Related Art

When a fixed image is continuously displayed on a display for a long time, an image sticking phenomenon in which a fixed specific image remains may occur. In the case of a liquid crystal display (LCD), the image sticking phenomenon may be caused by the fixation of a liquid crystal to a specific image. Further, in the case of an organic light-emitting diode (OLED) display, pixels which emit light to display a specific image may have decreasing luminous efficiency over time, and the light emitted by the pixels may have brightness lower than that of surrounding pixels, whereby the image sticking phenomenon may occur.

SUMMARY

An OLED display as a display in which each OLED element constituting a screen independently emits light, generally consumes less power and has higher color reproducibility than an LCD. Therefore, the OLED display may be a product attracting attention as a next-generation display but have a high probability of burn-in.

The OLED display expresses colors by mixing red, green, and blue which are three primary colors of light. Among the colors, a blue element has a shorter lifespan element of other colors. As a result, when the same screen is displayed for a long time, problems may occur in expressing a blue color, resulting in color combination-related problems. Image sticking or stains due to such problems may be burn-in.

Image sticking or stains caused by burn-in may reduce the visibility of a screen when a specific application is executed in an electronic device, and thus may inconvenience a user.

Various embodiments may provide a method and an electronic device which can prevent burn-in from occurring in a display.

According to various embodiments, an electronic device may include a display and a processor. The processor may be configured to: detect at least one outline corresponding to at least one graphic object included in a first image to be displayed through the display; generate a second image in which the at least one outline is adjusted to a first designated color and areas excluding the at least one outline in the first image are adjusted to a second designated color; and display the second image by using the display.

According to various embodiments, a method for preventing display burn-in in an electronic device may include: generating a second image in which at least one outline corresponding to at least one graphic object included in a first image to be displayed through a display is adjusted to a first designated color, and areas excluding the at least one outline in the first image are adjusted to a second designated color; and displaying the second image by using the display.

According to various embodiments, in storage media storing instructions, the instructions may be configured to cause at least one circuit to perform at least one operation, when executed by the at least one circuit. The at least one operation may include: detecting at least one outline corresponding to at least one graphic object included in a first image to be displayed through a display; generating a second image in which the at least one outline is adjusted to a first designated color, and areas excluding the at least one outline in the first image are adjusted to a second designated color; and displaying the second image by using the display.

An electronic device according to various embodiments can prevent burn-in from occurring when a screen is continuously displayed on a display or a screen of the same color is displayed for a long time.

When an electronic device according to various embodiments displays a screen on a display, the electronic device can: detect at least one outline (for example, an edge area or a border) corresponding to at least one graphic object included in a first image (for example, an application screen) to be displayed through the display; and adjust the at least one outline and areas (for example, a background area) excluding the at least one outline to colors causing less burn-in, thereby reducing the occurrence of burn-in.

When an electronic device according to various embodiments displays a screen on an organic light-emitting diode (OLED) display, the electronic device can reduce the consumption of a battery required for light emission by allowing only pixels, which correspond to at least one outline corresponding to at least one graphic object included in a first image (for example, an application screen) to be displayed through the display, to emit light and preventing pixels corresponding to areas (for example, a background color) excluding the at least one outline from emitting light, thereby increasing the light emission lifespan of pixels.

DETAILED DESCRIPTION

Figure 1:
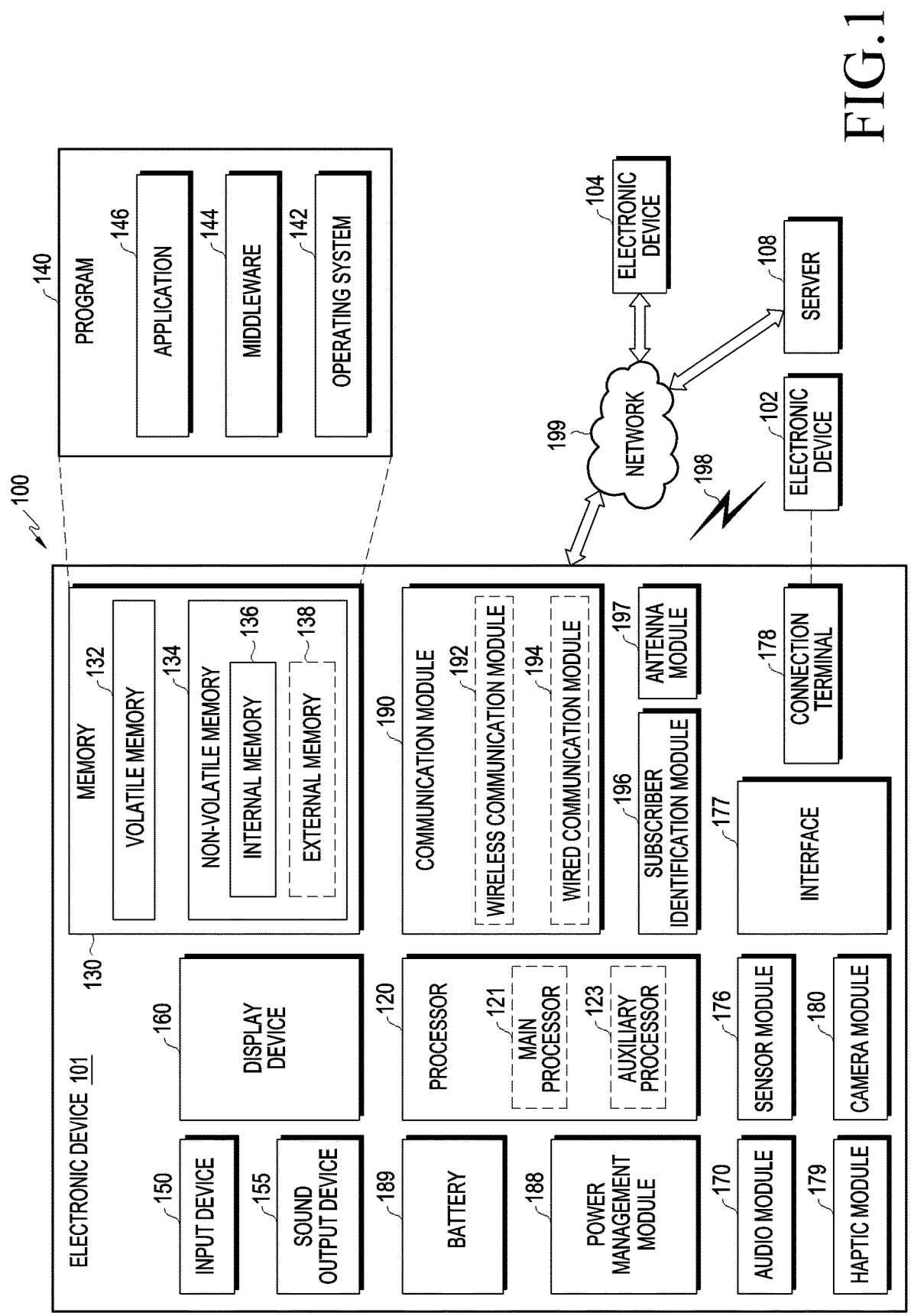
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

According to various embodiments, the electronic device 101 may transmit or receive power or a signal to or from the external electronic device 102 via the first network 198. According to an embodiment, the electronic device 101 may receive power wirelessly from the external electronic device 102.

The communication module 190 may transmit or receive a control signal or power information for receiving power in the external electronic device 102. The power information may include at least one of a residual battery amount, the number of times of charging, usage, battery capacity, or a battery rate of the electronic device 101. The communication module 190 of the electronic device 101 may transmit a charging function control signal for controlling a charging function of the electronic device 101. The charging function control signal may be a control signal for causing the charging function of the electronic device 101 to be enabled or disabled. Alternatively, the charging function control signal may include information related to power adjustment or power control commands to handle the occurrence of abnormal conditions according to various embodiments.

The antenna module 197 may transmit or receive a signal or power to or from the outside (e.g., the external electronic device) of the electronic device 101. According to an embodiment, the antenna module 197 may include one or more antennas, and at least one antenna appropriate for a communication scheme used in the communication network, such as the first network 198 or the second network 199, may be selected, for example, by the communication module 190 from the one or more antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
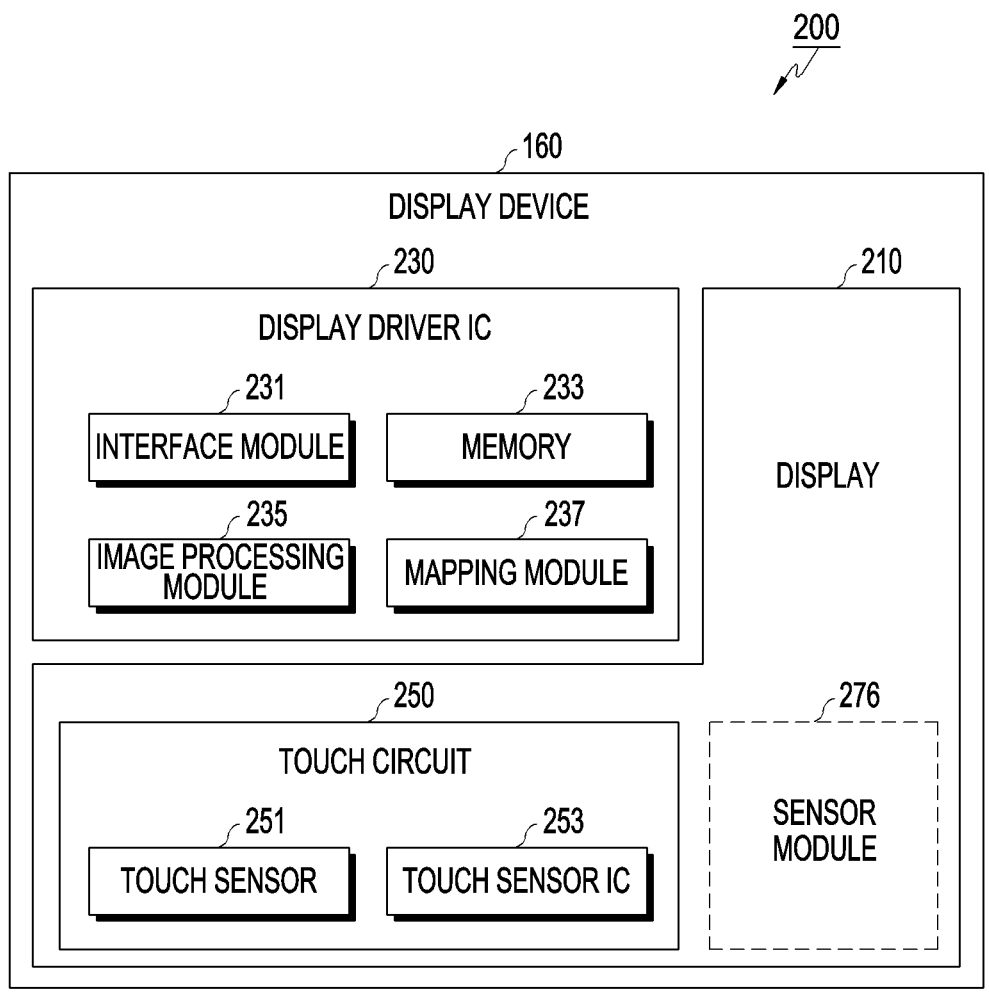
FIG. 2 is a block diagram of a display device according to various embodiments.

FIG. 2 is a block diagram 200 illustrating the display device 160 according to various embodiments.

Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 135. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

A display device 160 according to various embodiments may include an organic light-emitting diode (OLED) display.

Figure 3:
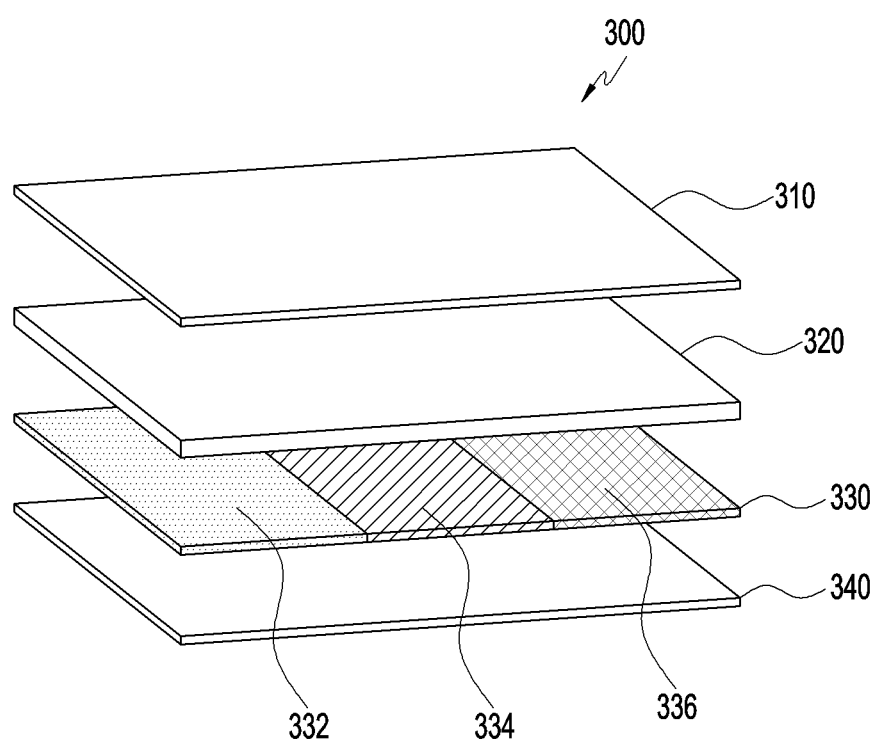
FIG. 3 illustrates an OLED display structure according to various embodiments.

FIG. 3 illustrates a part of an OLED display structure according to various embodiments. For example, FIG. 3 illustrates one pixel of the OLED display structure.

Referring to FIG. 3, an OLED display 300 (e.g., the display device 160 in FIG. 1 or 2) may have a structure including a polarizer 310 (or a polarizing element), an encap (glass) 320 (or a cover), an organic layer 330, and a thin film transistor (TFT) (glass) 340.

The organic layer 330 may be a layer disposed between the encap (glass) 320 and the TFT (glass) 340 and including a compound containing a carbon. Holes and electrons may be injected into the organic layer 330, and light and heat may be generated as the injected holes and electrons react with each other. According to one embodiment, one pixel of the organic layer 330 may include an R sub-pixel 332, a G sub-pixel 334, and a B sub-pixel 336 using compounds for generating light of red (R), green (G), and blue (B), respectively, and one pixel may be configured by the R sub-pixel 332, the G sub-pixel 334, and the B sub-pixel 336. In the organic layer 330, red light, green light, and blue light generated from the R sub-pixel 332, the G sub-pixel 334, and the B sub-pixel 336 may be mixed and pass through the polarizer 310 so as to express colors.

According to various embodiments, each of the R sub-pixel 332, the G sub-pixel 334, and the B sub-pixel 336 may gradually decrease in brightness in proportion to the light-emitting time. If only a specific pixel continuously emits light, the lifespan of the specific pixel is shortened compared to other pixels. Thus, the pixel that has generated relatively a large amount of light may become darker than other pixels.

For example, when an icon of the same color and shape is continuously displayed on the OLED display 300 (e.g., the display device 160 in FIG. 1 or 2), pixels corresponding to the color and shape of the icon may become dark and thus may cause burn-in in which the color and shape of the icon appear as image sticking or stains. The image sticking or stains caused by such burn-in may reduce the visibility of a display screen in an electronic device and thus may cause inconvenience to a user.

Figure 4:
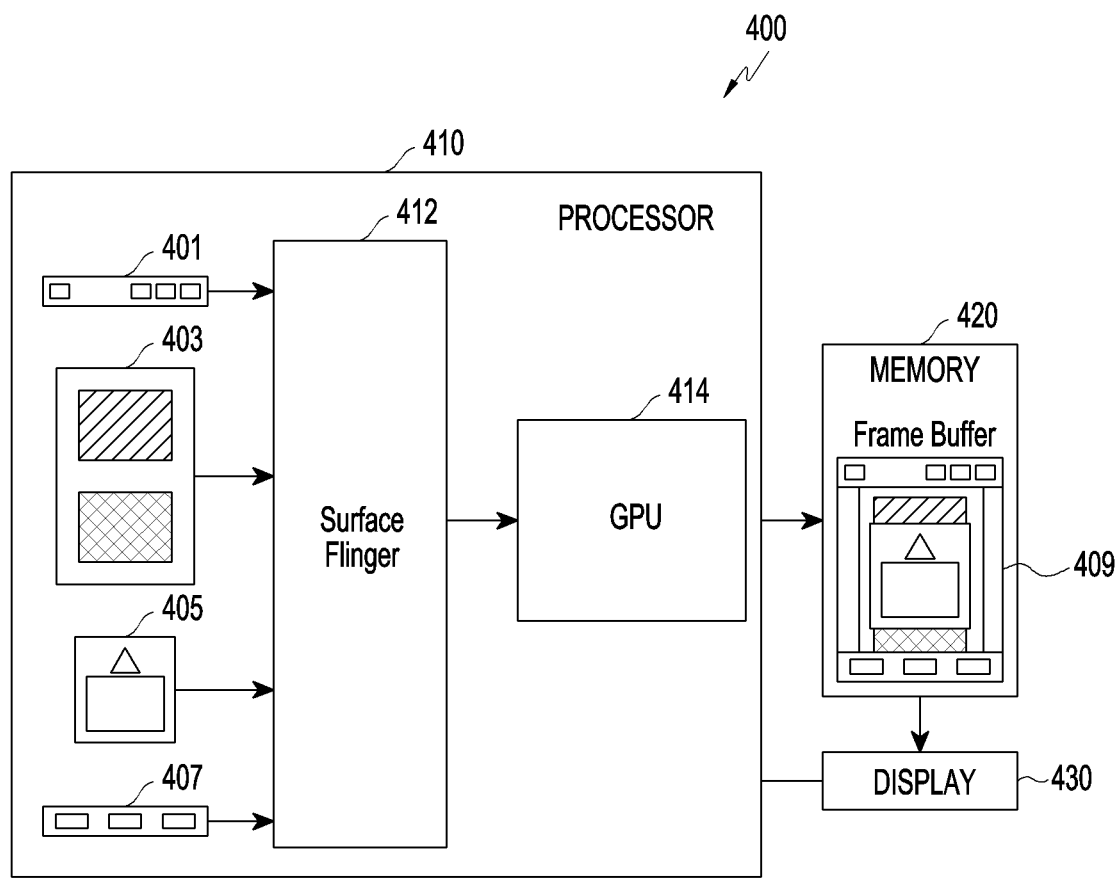
FIG. 4 is a block diagram of an electronic device for preventing burn-in from occurring on a display, according to various embodiments.

FIG. 4 is a block diagram of an electronic device for preventing burn-in from occurring on a display, according to various embodiments.

Referring to FIG. 4, an electronic device 400 (e.g., the electronic device 101 in FIG. 1) according to various embodiments may include a processor 410, a memory 420, and a display 430.

According to various embodiments, the processor 410 (e.g., the processor 120 in FIG. 1) may control at least one different component (e.g., the memory 420 or the display 430) of the electronic device 400, which is electrically connected to the processor 410, and may perform various data processing or operations, by executing software (e.g., the program 140). According to various embodiments, the processor 410 may detect at least one outline (for example, an edge or a border) corresponding to at least one graphic object in a first image (for example, a first screen) to be displayed on the display 430, and may generate a second image 409 in which the at least one outline is adjusted to a first designated color, and areas excluding the at least one outline in the first image are adjusted to a second designated color. According to various embodiments, the first designated color and/or the second designated color may be colors corresponding to designated or specific pixels. For example, the designated or specific pixel may be a pixel (for example, an R pixel, a G pixel, or a B pixel) having a lifespan longer than a designated period even when the pixel continuously emits light. The second image 409 generated by adjusting the at least one outline to a first designated color and adjusting areas excluding the at least one outline to a second designated color, may have the color of a pixel having a longer lifespan than the first image, and thus may cause less burn-in phenomenon than the first image.

The processor 410 according to various embodiments may display the second image 409 on the display 430 and may move the display position of the second image 409 displayed on the display 430. According to various embodiments, the case wherein only a pixel of a specific color of the display 430 continuously emits light may prevented by moving the display position of the second image 409, so that a burn-in phenomenon in which a pixel life of a specific color is shortened and thus the pixel becomes dark may be reduced.

According to various embodiments, the processor 410 may detect at least one outline having various sizes, colors, brightnesses, or saturations, based on the attributes (for example, size, color, brightness, saturation, or the like) of at least one graphic object included in a first image to be displayed on the display 430, by using an image filter and/or an edge extraction parameter. According to various embodiments, each of at least one outline may have a different width according to the attributes of at least one graphic object, the image filter, and/or the edge extraction parameter. According to various embodiments, the processor 410 may adjust the width of the at least one detected outline by adjusting an image filter parameter value or an edge extraction parameter value. For example, the processor 410 may cause the width of the at least one detected outline to narrow or widen over time, by adjusting the edge extraction parameter value, based on the time at which the first image is displayed on the display 430.

According to one embodiment, the memory 420, when executed, may store instructions that cause the processor 410 to: detect at least one outline (for example, an edge or a border) corresponding to at least one graphic object in the first image to be displayed on the display 430; display, on the display 430, the second image 409 in which the at least one outline is adjusted to a first designated color, and areas excluding the at least one outline are adjusted to a second designated color; and move a display position of the second image 409 displayed on the display 430, and the processor 410 may execute the instructions.

According to various embodiments, the processor 410 may include a surface flinger 412 and a graphic processing unit (GPU) 414. According to various embodiments, the surface flinger 412 may generate a first image to be displayed on the display 430 by collecting at least one display data (for example, also referred to as "surface" or "layer") 401, 403, 405, or 407 associated with various applications and functions executed in the electronic device 400, and thus may provide the first image to the GPU 414. For example, the at least one display data may include various indicator display data 401 associated with the electronic device 400, display data 403 associated with a first application, display data 405 associated with a second application, and display data 407 associated with a menu. For example, the at least one display data may include at least one graphic object, and the first image may include at least part or all of the at least one graphic object. According to various embodiments, the surface flinger 412 and the graphic processing unit (GPU) 414 may be implemented as functions performed by the processor 410 without any distinction therebetween.

According to various embodiments, the processor 410 may detect at least one outline corresponding to at least one graphic object included in a first image to be displayed through the display 430. According to one embodiment, the processor 410 may reduce the size of a first image to be displayed through the display 430, based on a designated ratio or a designated size, and may detect at least one outline corresponding to at least one graphic object included in the reduced first image.

The processor 410 may generate the second image 409 in which a color of at least one outline detected in a first image is adjusted to a first color and a color of areas excluding the at least one outline is adjusted to a second color. According to various embodiments, each of the at least one detected outline may have a different width, and the processor 410 may detect an outline having a designated width or greater among the at least one detected outline.

The processor 410 may provide the second image 409 to the memory 420 (e.g., a frame buffer) and may display the second image 409 on the display 430. The processor 410 may perform control such that a display position of the second image 409 displayed on the display 430 is moved. For example, the processor 410 may display the second image 409 at a first position on the display 430 and display the second image 409 at a second position on the display 430, based on a designated condition (for example, a designated time interval, a designated distance interval, or a designated pixel interval), so as to perform control such that the display position of the second image 409 on the display 430 is moved.

According to one embodiment, the processor 410 may move the display position of the second image 409 in an entire screen area of the display 430 or in a virtual area having a size different from that of the entire screen area. According to various embodiments, the processor 410 may change the display position of the second image 409 within the entire screen area of the display 430, may move the display position of the second image 409 within an increased area, which is a virtual area, obtained by increasing the entire screen area of the display 430, or may move the display position of the second image 409 within a reduced area, which is a virtual area, obtained by reducing the size of the entire screen area of the display 430.

According to one embodiment, when the display position of the second image 409 is moved within the increased area, an empty area in which no images are displayed may be generated in the entire screen area of the display 430, in proportion to a portion moved from the second image 409 to the increased area. The processor 410 may display a color associated with the second image 409 in the empty area of the entire screen area, in which no images are displayed.

According to one embodiment, when the display position of the second image 409 is moved within the reduced area, a part of the second image 409 as much as the reduced area of the entire screen area may not be displayed in the entire screen area of the display 430.

According to various embodiments, the processor 410 may move the display position of the second image 409 at a designated time interval (for example, 0.01 seconds, 0.05 seconds, or 1 second) or a designated distance interval (for example, a distance of one of 1 to 4 pixels) or continuously up, down, leftwards, rightwards, or diagonally. According to various embodiments, the processor 410 may change the movement speed or movement interval of the display position of the second image 409 over time.

For example, when a first image included in at least one graphic object (for example, a blue icon) is continuously displayed at a fixed position of the display 430, the pixels (for example, B pixels) corresponding to a blue color of the display 430 may continuously emit light. When the B pixels continuously emit light, the lifespan of the B pixels becomes shorter other pixels (for example, R pixels or G pixels) and thus a phenomenon (e.g., a burn-in phenomenon) in which the B pixels become darker than the other pixels may occur.

According to various embodiments, the processor 410 may reduce the burn-in phenomenon by: detecting an outline of a blue icon; generating a second image in which the outline is adjusted to a first designated color, for example, a color (for example, red or green) of a pixel (for example, R pixels or G pixels) having a longer lifespan than a blue color and areas excluding the outline are adjusted to a second designated color; and moving the second image such that the second image is not displayed at a fixed position.

According to various embodiments, at least one graphic object may include icons, buttons, and the like, and may be a user interface object enabling a touch input by a user.

According to various embodiments, the processor 410 may identify a user input (for example, a gesture input such as a touch) onto an outline corresponding to at least one graphic object even when the second image has been moved, and may perform a function corresponding to the user input.

According to various embodiments, the first image may include a first application screen, and the processor 410 may move the display position of the second image, based on a display condition associated with the first application screen. For example, when the first application screen needs to be continuously displayed for a predetermined time or longer, at least one outline corresponding to at least one graphic object included in a first image to be displayed through the display 430 may be detected based on a burn-in prevention process, a second image in which a color of the at least one outline is adjusted to a first designated color, and areas excluding the at least one outline are adjusted to a second designated color may be displayed on the display 430, and the display position of the second image displayed on the display 430 may be moved. For example, the first application screen may be a screen on which a fixed graphic user interface (GUI) is continuously displayed and may be a screen in a mode enabling automatic play without a user input, like an auto mode screen of a game application.

According to various embodiments, the processor 410 may perform operations according to the burn-in prevention process when a designated start condition (a burn-in prevention start condition) is satisfied. According to various embodiments, the designated start condition may refer to a case in which the first image is continuously displayed for a designated time or longer (for example, 10 seconds or longer, 30 seconds or longer, or 1 minute or longer), or a case in which no user input is made for a predetermined time or longer (For example, 10 seconds or more, 30 seconds or more, or 1 minute or more) after the first image is displayed.

According to various embodiments, when a designated termination condition (a burn-in prevention termination condition) is satisfied, the processor 410 may stop displaying the second image 409 on the display and may display the first image again. According to various embodiments, the termination condition may be a case in which an application function is terminated or a new image needs to be displayed while the second image 409 is being displayed, or a case in which a user input is received while the second image is being displayed.

According to various embodiments, an electronic device (e.g., the electronic device 101 in FIG. 1 or the electronic device 400 in FIG. 4) may prevent burn-in from occurring when the same image (e.g., the same screen) or the same color is continuously displayed on a display (e.g., the display device 160 in FIG. 1 or the display 430 in FIG. 4) for a long time.

An electronic device (e.g., the electronic device 101 in FIG. 1 or the electronic device 400 in FIG. 4) according to various embodiments, when a screen (e.g., a first image) is displayed on a display (e.g., the display device 160 in FIG. 1 or the display 430 in FIG. 4), may prevent the state in which only specific pixels of the display (e.g., the display device 160 in FIG. 1 or the display 430 of FIG. 4) continuously emit light by detecting at least one outline corresponding to at least one graphic object included in a first image to be displayed, generating and displaying a second image in which the at least one detected outline are adjusted to a first designated color, and areas excluding the at least one outline in the first image are adjusted to a second designated color, and moving the second image according to a designated condition, thereby reducing the occurrence of burn-in.

An electronic device (e.g., the electronic device 101 in FIG. 1 or the electronic device 400 in FIG. 4) according to various embodiments, when a screen (e.g., a first image) is displayed on an organic light-emitting diode (OLED) (e.g., the OLED display 300 in FIG. 3), may reduce the consumption of a battery required for light emission by allowing only pixels that correspond to at least one outline corresponding to at least one graphic object included in a first image to emit light and preventing pixels corresponding to areas excluding the at least one outline from emitting light, thereby increasing the light emission lifespan of pixels.

According to various embodiments, an electronic device (e.g., the electronic device 101 in FIG. 1 or the electronic device 400 in FIG. 4) may include a display (e.g., the display device 160 in FIG. 1 or the display 430 in FIG. 4) and a processor (e.g., the processor 120 in FIG. 1 or the processor 410 in FIG. 4). The processor may be configured to: detect at least one outline corresponding to at least one graphic object included in a first image to be displayed through the display; generate a second image in which the at least one outline is adjusted to a first designated color and areas excluding the at least one outline in the first image are adjusted to a second designated color; and display the second image by using the display.

According to various embodiments, the processor (e.g., the processor 120 in FIG. 1 or the processor 410 in FIG. 4) may be configured to determine the first designated color, based at least on a color of the at least one graphic object corresponding to the at least one outline.

According to various embodiments, the processor (e.g., the processor 120 in FIG. 1 or the processor 410 in FIG. 4) may be configured to: generate a third image in which the first designated color of the at least one outline included in the second image is adjusted to a third designated color; and display the third image through the display.

According to various embodiments, the processor (e.g., the processor 120 in FIG. 1 or the processor 410 in FIG. 4) may be configured to adjust, as at least part of the operation of generating the second image, the width of the at least one outline to a first designated width.

According to various embodiments, the processor (e.g., the processor 120 in FIG. 1 or the processor 410 in FIG. 4) may be configured to: generate a third image in which the at least one outline is adjusted to have a second designated width smaller than the first designated width; and display the third image through the display.

According to various embodiments, the processor (e.g., the processor 120 in FIG. 1 or the processor 410 in FIG. 4) may be configured to generate, as at least part of the operation of generating the second image, the second image having a size smaller than the size of the first image.

According to various embodiments, the processor (e.g., the processor 120 in FIG. 1 or the processor 410 in FIG. 4) may be configured to: display the second image at a first position on the display; and display the second image at a second position on the display, based at least on a designated condition.

According to various embodiments, the processor (e.g., the processor 120 in FIG. 1 or the processor 410 in FIG. 4) may be configured such that at least a part of the second image is not displayed through the display, based at least on the first position or the second position.

According to various embodiments, the processor (e.g., the processor 120 in FIG. 1 or the processor 410 in FIG. 4) may be configured to identify a user gesture input onto the at least one outline while the second image is being displayed at the second position on the display, and perform a function corresponding to the input user gesture.

According to various embodiments, the first image may include an image of an application being executed in the electronic device, and configuration may be made such that the second image is displayed at the second position on the display, based on a display condition associated with the application. According to various embodiments, the processor (e.g., the processor 120 in FIG. 1 or the processor 410 in FIG. 4) may be configured to display the second image at the first position when a designated condition is satisfied while the second image is being displayed at the second position on the display.

According to various embodiments, the display (e.g., the display device 160 in FIG. 1 or the display 430 in FIG. 4) may be an organic light-emitting diode (OLED) display.

Figure 5:
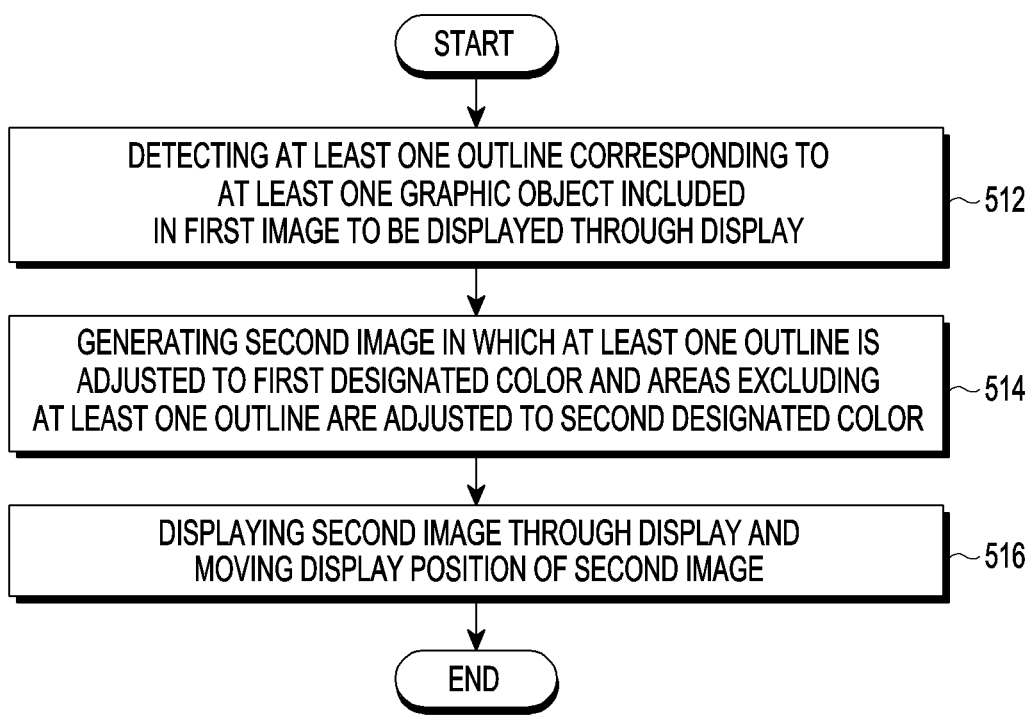
FIG. 5 is a flowchart illustrating operations in an electronic device for preventing burn-in from occurring on a display, according to various embodiments.

FIG. 5 is a flowchart illustrating operations in an electronic device for preventing burn-in from occurring on a display, according to various embodiments.

Operations 512 to 518 according to various embodiments may be understood as operations performed by a processor (e.g., the processor 120 in FIG. 1 or the processor 410 in FIG. 4, and hereinafter, the processor 410 in FIG. 4 will be described as an example) of an electronic device (e.g., the electronic device 101 in FIG. 1 or the electronic device 400 in FIG. 4). According to one embodiment, at least one of the operations 512 to 516 may be omitted, the orders of some of the operations may be reversed, or another operation may be added.

According to various embodiments, in operation 512, the processor 410 may detect at least one outline corresponding to at least one graphic object included in a first image (e.g., a first screen) to be displayed through a display (e.g., the display device 160 in FIG. 1 or the display 430 in FIG. 4). According to one embodiment, the processor 410 may acquire a first image generated to display, on the display 430, at least one display data (for example, 401, 403, 405, or 407 in FIG. 4) associated with various applications and functions executed in the electronic device 400, and may detect at least one outline (for example, an edge or a border) corresponding to at least one graphic object included in the first image. The at least one graphic object may be, for example, images of various types including icons, buttons, letters, or numbers.

According to one embodiment, the processor 410 may extract an outline corresponding to at least one graphic object included in the first image by applying an image filter and/or an edge extraction parameter to the first image. According to one embodiment, the image filter may include a Laplacian/Laplacian of Gaussian Filter. For example, the processor 410 may detect at least one outline having various sizes, colors, and brightness, based on the attributes (for example, size, color, brightness, saturation, or the like) of at least one graphic object included in the first image to be displayed on the display 430, by using the image filter and/or the edge extraction parameter.

According to various embodiments, each of the at least one detected outline may have a different width according to the attributes of at least one graphic object, an image filter, and/or an edge extraction parameter. According to various embodiments, the processor 410 may adjust the width of the at least one detected outline by adjusting an edge extraction parameter value. For example, the processor 410 may cause the width of the at least one detected outline to narrow or widen over time, by adjusting the edge extraction parameter value, based on the time at which a first image is displayed on the display 430.

According to various embodiments, in operation 514, the processor 410 may generate a second screen by adjusting at least one outline to a first color and adjusting area excluding the at least one outline to a second color. According to one embodiment, the processor 410 may also generate a third screen in which the first designated color of the at least one outline included in the second image is adjusted to a third designated color after a designated time interval. For example, the first designated color may be the same color as the color of at least one graphic object, and the second designated color or the third designated color may be an achromatic color, such as grey or black.

According to various embodiments, in operation 516, the processor 410 may display a second image through the display 430 and may move the display position of the second image. According to various embodiments, the processor 410 may display the second image at a first position on the display 430 and may display the second image at a second position on the display, based on a designated condition.

According to various embodiments, the processor 410 may move the display position of the second image 409 within the entire screen area of the display 430, or may move the display position of the second screen 409 within a virtual increased area or reduced area obtained by increasing or reducing the size of the entire screen area of the display 430. According to one embodiment, when the display position of the second image 409 is moved within the increased area, an empty area in which no images are displayed may be generated in the entire screen area of the display 430, in proportion to a portion moved from the second image 409 to the increased area. The processor 410 may display a color associated with the second image 409 in the empty area. According to one embodiment, when the display position of the second image 409 is moved within the reduced area, a part of the second image 409 as much as the reduced area of the entire screen area may not be displayed in the entire screen area of the display 430.

According to various embodiments, the processor 410 may move the display position of the second image 409 at a designated time interval (for example, 0.01 seconds, 0.05 seconds, or 1 second) or a designated distance interval (for example, a distance of one of 1 to 4 pixels) or continuously up, down, leftwards, rightwards, or diagonally. According to various embodiments, the processor 410 may change the movement speed or movement distance of the display position of the second screen 409 over time. According to various embodiments, the processor 410 may also display the second image by changing the first designated color of at least one outline in the second image 409 to a third designated color while moving the display position of the second image 409.

According to various embodiments, at least one graphic object may include icons, buttons, and the like, and may be a graphic object enabling a user interface. According to various embodiments, the processor 410 may identify a user gesture input onto an outline corresponding to at least one graphic object even when the second image has been moved, and may perform a function corresponding to the input user gesture.

According to various embodiments, the second image 409 may include a first application screen, and the processor 410 may move the display position of the second image, based on a display condition associated with the first application screen. According to various embodiments, when the application function is terminated or a new third image is displayed while the second image 409 is being displayed, or when a user input is received while the second image is being displayed, the processor 410 may stop displaying or moving the second image 409 on the display, and may display the first image.

According to various embodiments, a method for preventing display burn-in in an electronic device (e.g., the electronic device 101 in FIG. 1 or the electronic device 400 in FIG. 4) may include: detecting at least one outline corresponding to at least one graphic object included in a first image to be displayed through the display (e.g., the display device 160 in FIG. 1 or the display 430 in FIG. 4); generating a second image in which the at least one outline is adjusted to a first designated color and areas excluding the at least one outline in the first image are adjusted to a second designated color; and displaying the second image by using the display. According to various embodiments, in the method, the first designated color may be determined based at least on the color of the at least one graphic object corresponding to the at least one outline.

According to various embodiments, the method may further include: generating a third image in which the first designated color of the at least one outline included in the second image is adjusted to a third designated color; and displaying the third image through the display.

According to various embodiments, the generating of the second image may include adjusting the width of the at least one outline in the first image to a first designated width.

According to various embodiments, the method may further include: generating a third image in which the width of the at least one outline in the first image are adjusted to a second designated width smaller than the first designated width; and displaying the third image through the display.

According to various embodiments, in the method, the second image may be generated to have a size smaller than the size of the first image.

According to various embodiments, the method may further include: displaying the second image at a first position on the display; and displaying the second image at a second position on the display, based at least on a designated condition.

According to various embodiments, in the method, at least a part of the second image may not be displayed through the display, based at least on the first position or the second position.

Figure 6:
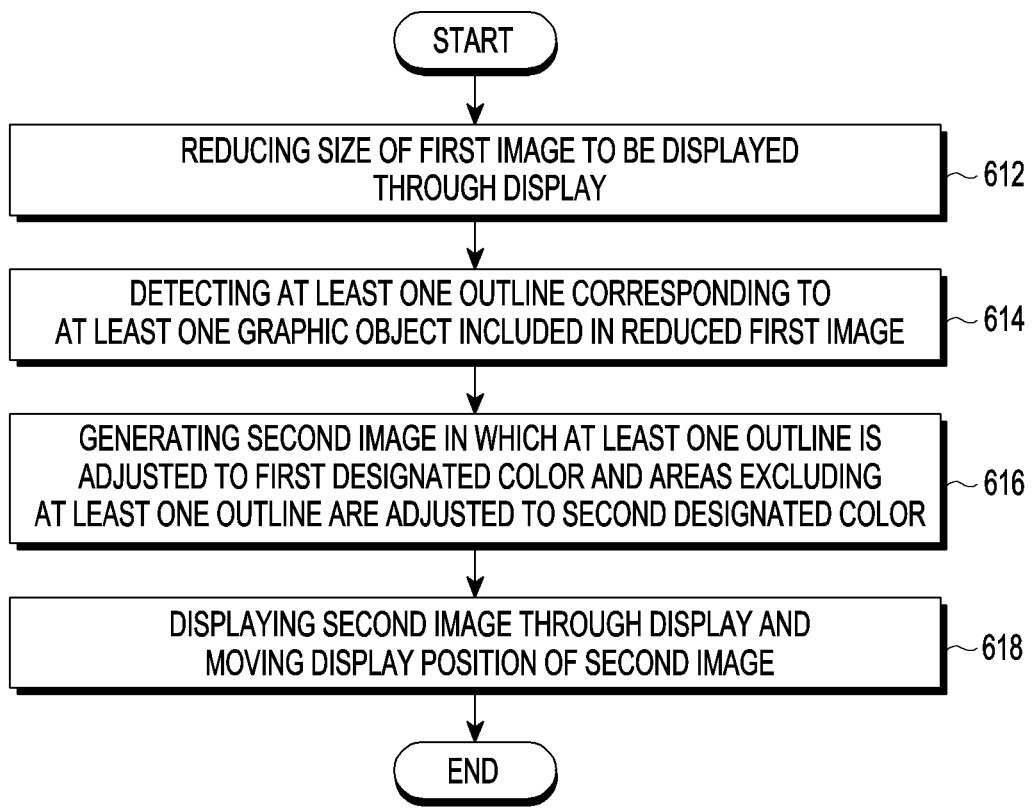
FIG. 6 is a flowchart illustrating operations of generating a second image by reducing the size of a first image to be displayed on a display according to various embodiments.

FIG. 6 is a flowchart illustrating operations of generating a second image by reducing the size of a first image to be displayed on a display according to various embodiments.

Operations 612 to 618 according to various embodiments may be understood as operations performed by a processor (e.g., the processor 120 in FIG. 1 or the processor 410 in FIG. 4, and hereinafter, the processor 410 in FIG. 4 will be described as an example) of an electronic device (e.g., the electronic device 101 in FIG. 1 or the electronic device 400 in FIG. 4). According to one embodiment, at least one of the operations 612 to 618 may be omitted, the orders of some of the operations may be reversed, or another operation may be added.

According to various embodiments, in operation 612, the processor 410 may reduce the size of a first image to be displayed through a display (e.g., the display device 160 in FIG. 1 or the display 430 in FIG. 4). According to one embodiment, the processor 410 may acquire a first image to be displayed on the display 430, by using at least one display data (e.g., 401, 403, 405, or 407 in FIG. 4) associated with various applications and functions executed in the electronic device 400, and may reduce the size of the acquired first image. According to various embodiments, the processor 410 may reduce the size of the first image to a size smaller than the entire screen area of a display by using dynamic resolution solution (DRS) scaling. For example, the processor 410 may reduce the size of the first image at a designated ratio or to a designated size, based on the size of the entire screen area. For example, the designated ratio may be 90% of the entire screen area, and the designated size may be a size reduced by a designated pixel (for example, 1 to 4 pixels), in comparison with the total size of the entire screen area.

According to various embodiments, in operation 614, the processor 410 may detect at least one outline corresponding to at least one graphic object included in the reduced first image. According to one embodiment, the processor 410 may detect at least one outline corresponding to at least one graphic object included in the reduced first image by applying an image filter or an edge parameter to the reduced first image. According to one embodiment, the image filter may include a Laplacian/Laplacian of Gaussian Filter. For example, the processor 410 may detect at least one outline having various sizes, colors, brightnesses, or saturations, based on the attributes (for example, size, color, brightness, saturation, or the like) of at least one graphic object included in the reduced first image, by using the image filter and/or the edge extraction parameter. According to various embodiments, each of the at least outline may have a different width according to the attributes of at least one graphic object, an image filter, and/or an edge extraction parameter. According to various embodiments, the processor 410 may adjust the width of at least one detected outline by adjusting the image filter parameter value or the edge extraction parameter value. For example, the processor 410 may cause the width of the at least one detected outline to narrow or widen over time, by adjusting the image filter parameter or edge extraction parameter value, based on the time at which a first image is displayed on the display 430. According to various embodiments, the at least one graphic object may include icons, buttons, and the like, and may be a user interface object enabling a touch input by a user.

According to various embodiments, in operation 616, the processor 410 may generate a second image in which at least one outline is adjusted to a first designated color, and areas excluding the at least one outline are adjusted to a second designated color. According to one embodiment, the processor 410 may generate the second image by changing the at least one outline, corresponding to the at least one graphic object (for example, an image of various shapes including icons, buttons, letters, or numbers) included in a reduced first image, to have a first designated color and changing the remaining areas excluding the at least one outline to have a second designated color. According to one embodiment, the processor 410 may also generate a third screen in which the first designated color of the at least one outline included in the second image is adjusted to a third designated color after a designated time interval. For example, the processor 410 may detect an outline of an icon having a specific color (blue color), and may generate a second image in which the outline is adjusted to a first designated color, for example, a color (for example, red or green) of a pixel (for example, an R pixel or a G pixel) having a longer lifespan than a blue color and areas excluding the outline are adjusted to a second designated color (for example, an achromatic color, such as grey or black), so a pixel having a longer lifespan than other pixels is used on the second image, thereby reducing the occurrence of burn-in.

According to various embodiments, in operation 618, the processor 410 may display the second image through the display 430 and may move the display position of the second image within the entire screen area of the display 430. According to various embodiments, the processor 410 may display the second image at a first position on the display 430 and display the second image at a second position on the display, based on a designated condition. According to various embodiments, the processor 410 may move the display position of the second image at a designated time interval (for example, 0.01 seconds, 0.05 seconds, or 1 second) or a designated distance interval (for example, a distance of one of 1 to 4 pixels) or continuously up, down, leftwards, rightwards, or diagonally. According to various embodiments, when an application function is terminated or a new third image is displayed while the second image is displayed, or when a user input is received while the second image is displayed, the processor 410 may stop displaying or moving the second image on the display, and may display the first image.

FIGS. 7A, 7B, 7C, 7D, and 7E illustrate examples of a screen for explaining operations of generating a second image by reducing the size of a first image to be displayed through a display, according to various embodiments.

Figure 7A:
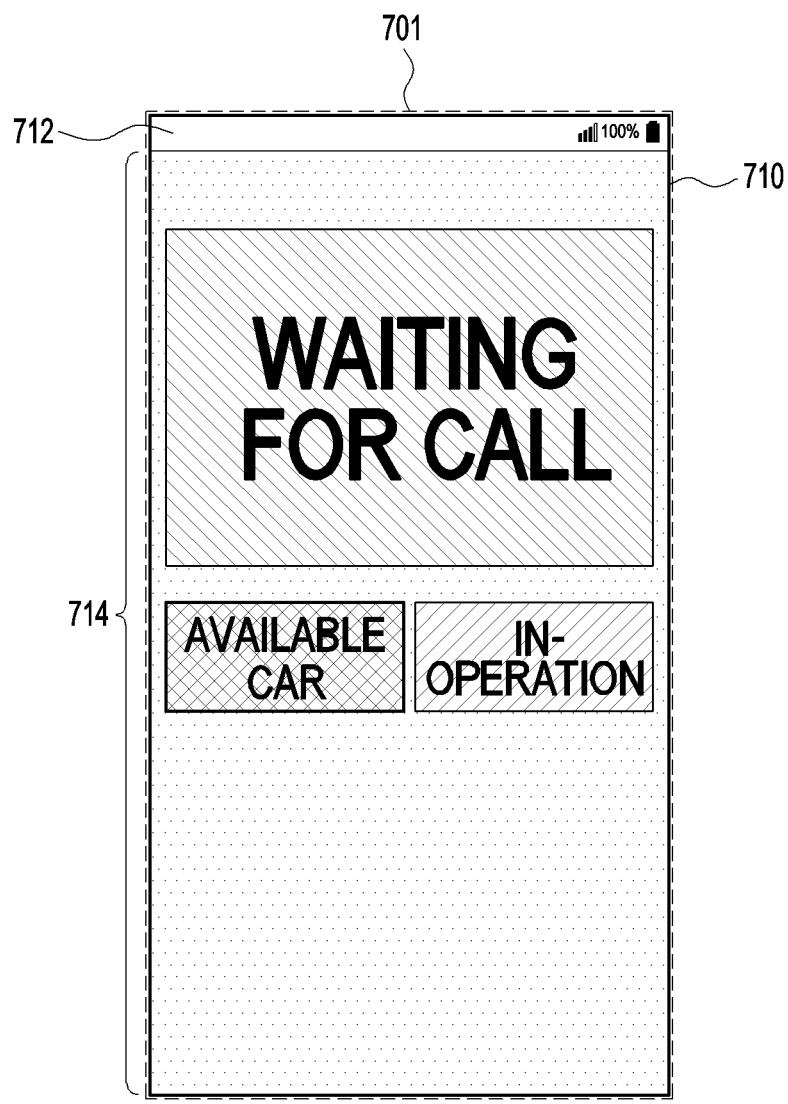
FIGS. 7A, 7B, 7C, 7D, and 7E illustrate examples of a screen for explaining operations of generating a second image by reducing the size of a first image to be displayed through a display, according to various embodiments.

Referring to FIG. 7A, a first image 710 to be displayed on a display (e.g., the display device 160 in FIG. 1 or the display 430 in FIG. 4), according to various embodiments, may include various indicator display data 712 associated with an electronic device and display data 714 associated with a first application. According to various embodiments, the size of the first image 710 may be the same as the size of the entire screen area 701 of the display.

Figure 7B:
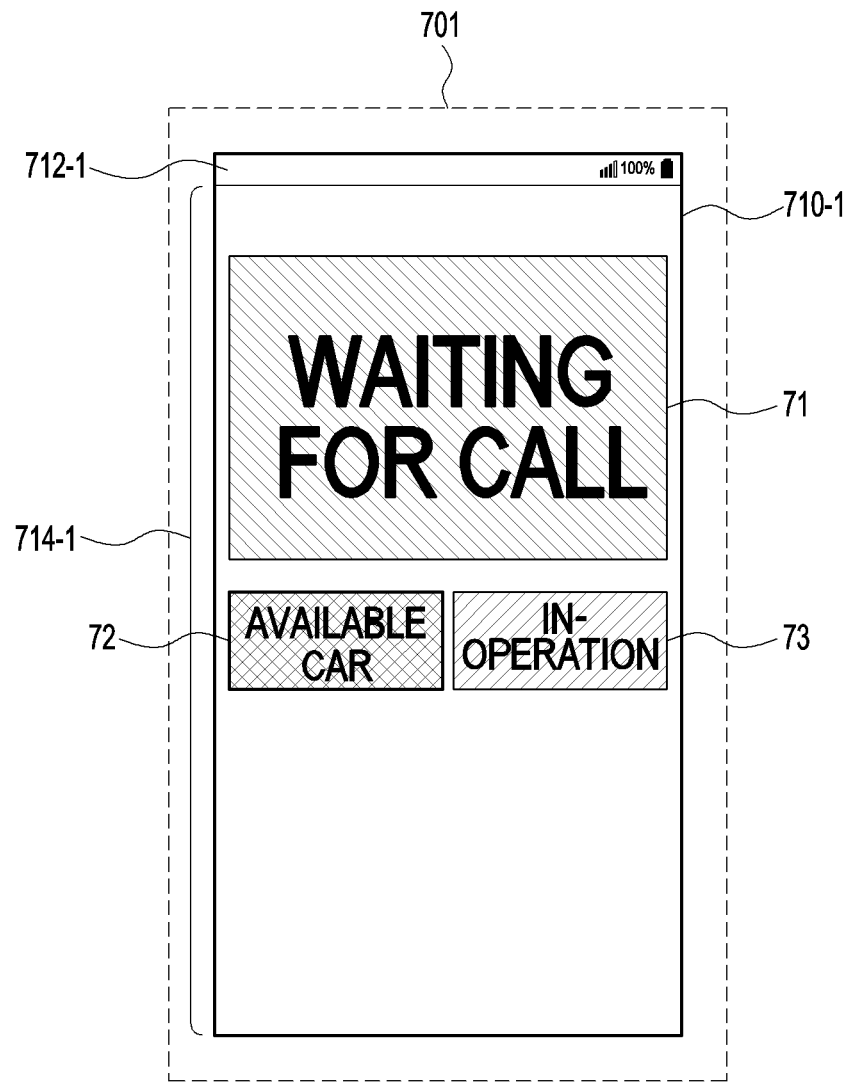

Referring to FIG. 7B, the first image 710 according to various embodiments may be reduced to an image 710-1 having a size smaller than the size of the entire screen area 701 of a display, by using dynamic resolution solution (DRS) scaling. For example, the size of the first image 710 may be reduced at a designated ratio or to a designated size, based on the size of the entire screen area 701. For example, the designated ratio may be 90% of the entire screen area, and the designated size may be a size reduced by a designated pixel (for example, 1 to 4 pixels), in comparison with the total size of the entire screen area 701. According to one embodiment, as the first image 710 is reduced, various indicator display data 712 associated with the electronic device and the display data 714 associated with the first application may also be reduced at a ratio the same as or similar to the ratio at which the display data 712-1 and 714-1 are reduced, respectively. According to various embodiments, the first image 710 may include at least one graphic object 71, 72, and 72.

Figure 7C:
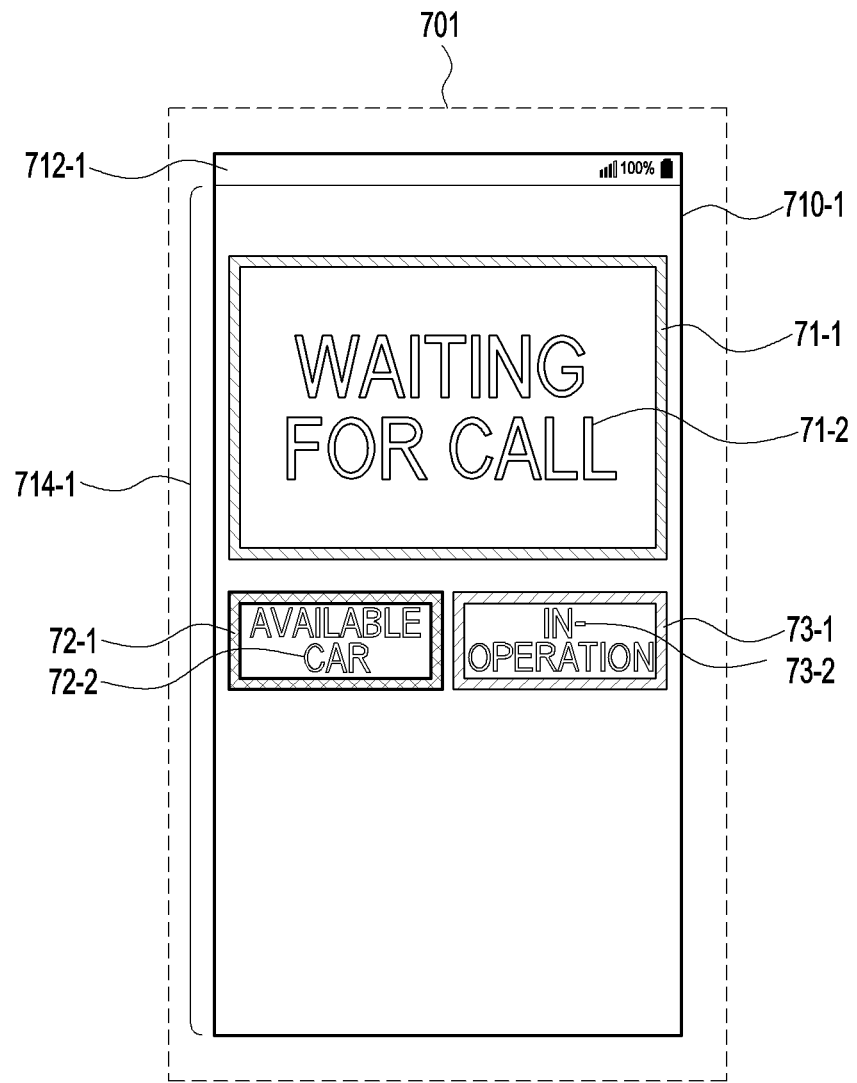

Referring to FIG. 7C, at least one outline 71-1, 71-2, 72-1, 72-2, 73-1, or 73-2 corresponding to at least one graphic object may be detected in the reduced first image 710-1 according to various embodiments. According to various embodiments, as an image filter (e.g., a Laplacian/Laplacian of Gaussian Filter) or an edge extraction parameter is applied to the reduced first screen 710-1, the at least one outline 71-1, 71-2, 72-1, 72-2, 73-1, or 73-2 corresponding to the at least one graphic object (for example, 71, 72, or 72 in FIG. 7B) may be extracted from the reduced first screen 710-1. For example, the at least one outline 71-1, 71-2, 72-1, 72-2, 73-1, or 73-2 may be the same color as the graphic object corresponding thereto.

Figure 7D:
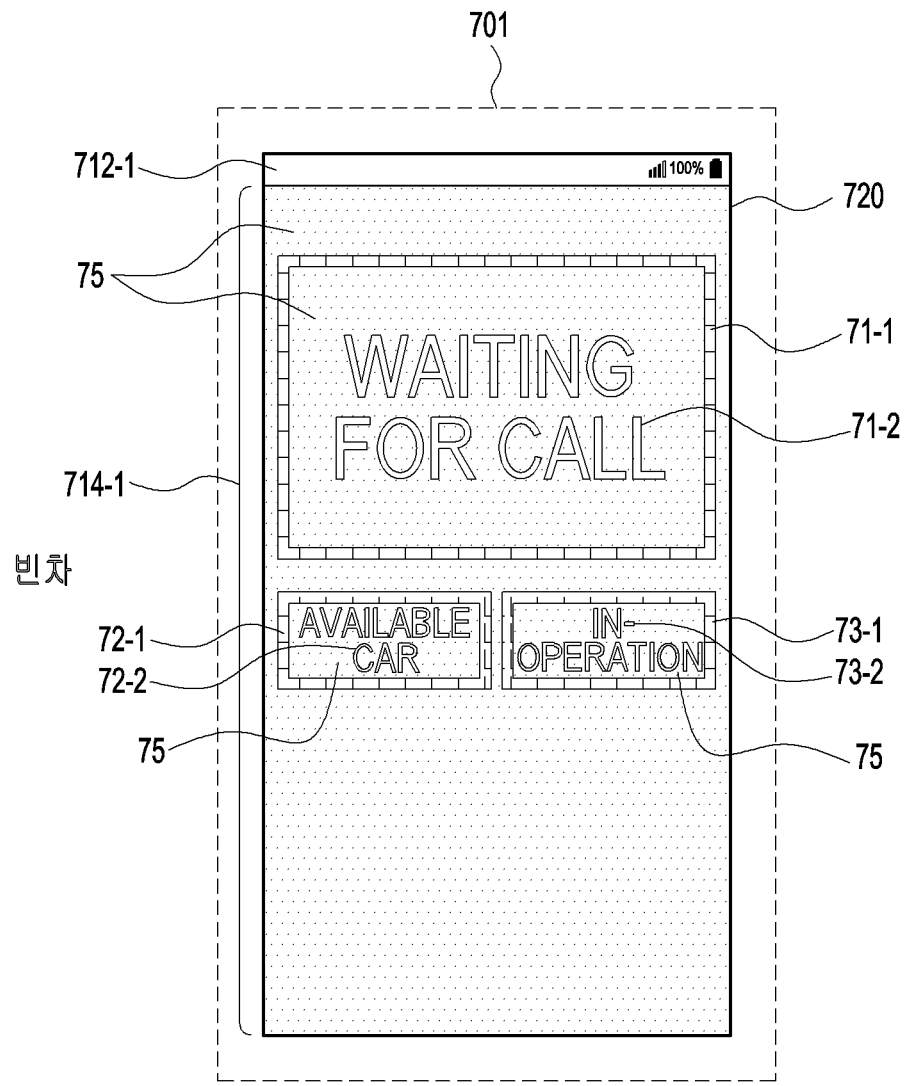

Referring to FIG. 7D, when at least one outline 71-1, 71-2, 72-1, 72-2, 73-1, or 73-2 according to various embodiments is detected, a second image 720 in which the at least one outline 71-1, 71-2, 72-1, 72-2, 73-1, or 73-2 is adjusted to a first designated color and areas 75 excluding the at least one outline are adjusted to a second designated color may be generated. According to various embodiments, the second image in which the at least one outline 71-1, 71-2, 72-1, 72-2, 73-1, or 73-2 is adjusted to a first designated color, for example, a color of a pixel having a relatively long lifespan and areas 75 excluding the at least one outline are adjusted to a second designated color (for example, an achromatic color, such as grey or black) may be generated to allow a pixel having a longer lifespan than other pixels to be used on the second image, so that the occurrence of burn-in may be reduced.

Figure 7E:
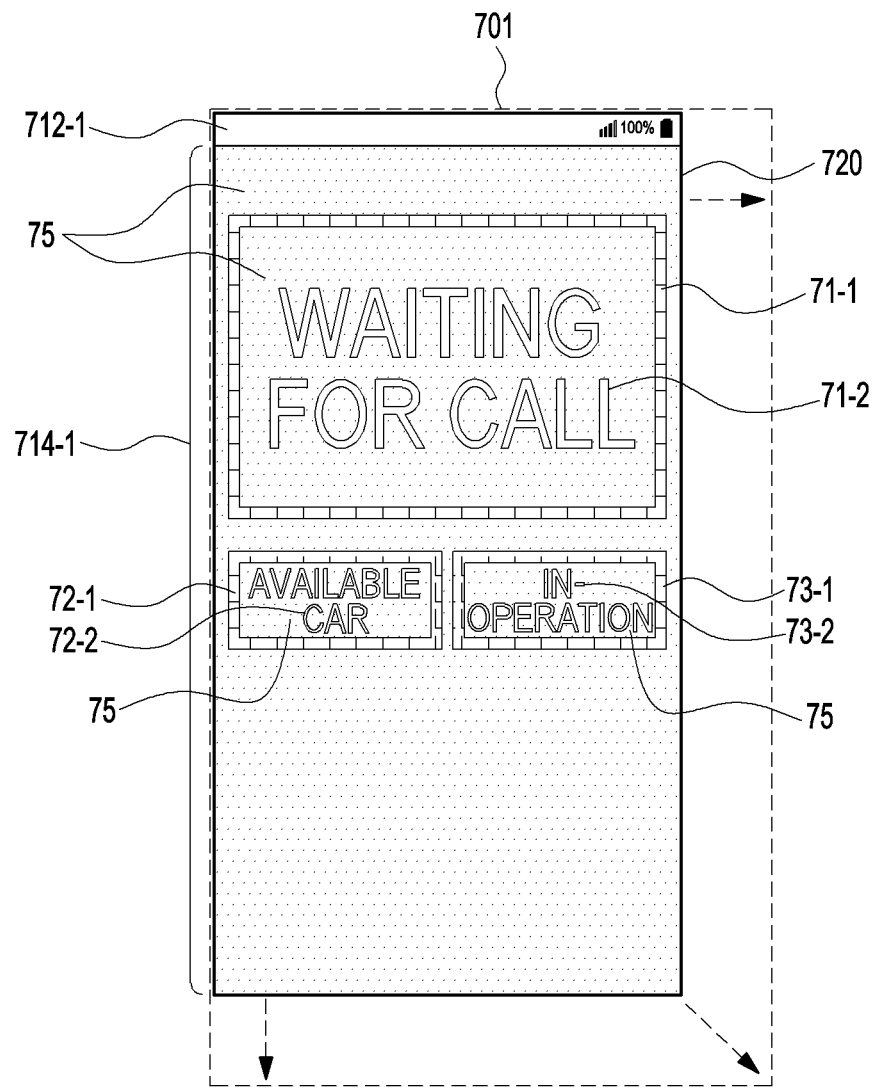

Referring to FIG. 7E, the display position of the second image 720 having a size of the reduced first image according to various embodiments may be moved within the entire screen area 701 of the display. According to various embodiments, the display position of the second image 720 may be moved at a designated time interval (for example, 0.01 seconds, 0.05 seconds, or 1 second) or a designated distance interval (for example, a distance of one of 1 to 4 pixels) or continuously up, down, leftwards, rightwards, or diagonally. According to various embodiments, the movement speed or movement interval of the display position of the second image 720 may be changed over time. According to various embodiments, the second image may also be displayed by changing the first designated color of the at least one outline in the second image 720 to a third designated color while the display position of the second image 720 is moved.

According to various embodiments, a part 72 and 73 of at least one graphic object may a graphic object enabling a gesture input by a user, and when a user gesture (for example, a touch input) is input onto the at least one outline 72-1, 72-2, 73-1, or 73-1 corresponding to the at least one graphic object 72 and 73 while the second image 720 is displayed after having been moved, a function corresponding to the input user gesture may be performed. For example, a different image may be displayed according to the function corresponding to a user gesture.

According to various embodiments, the second image 720 may include a specific application execution screen image, and when execution of a specific application is terminated or a new third image needs to be displayed, or when a user input is received while the second image 720 is being displayed, the display and the movement of the second image 720 in the display area 701 may be stopped, and the first image 710 may be displayed.

Figure 8:
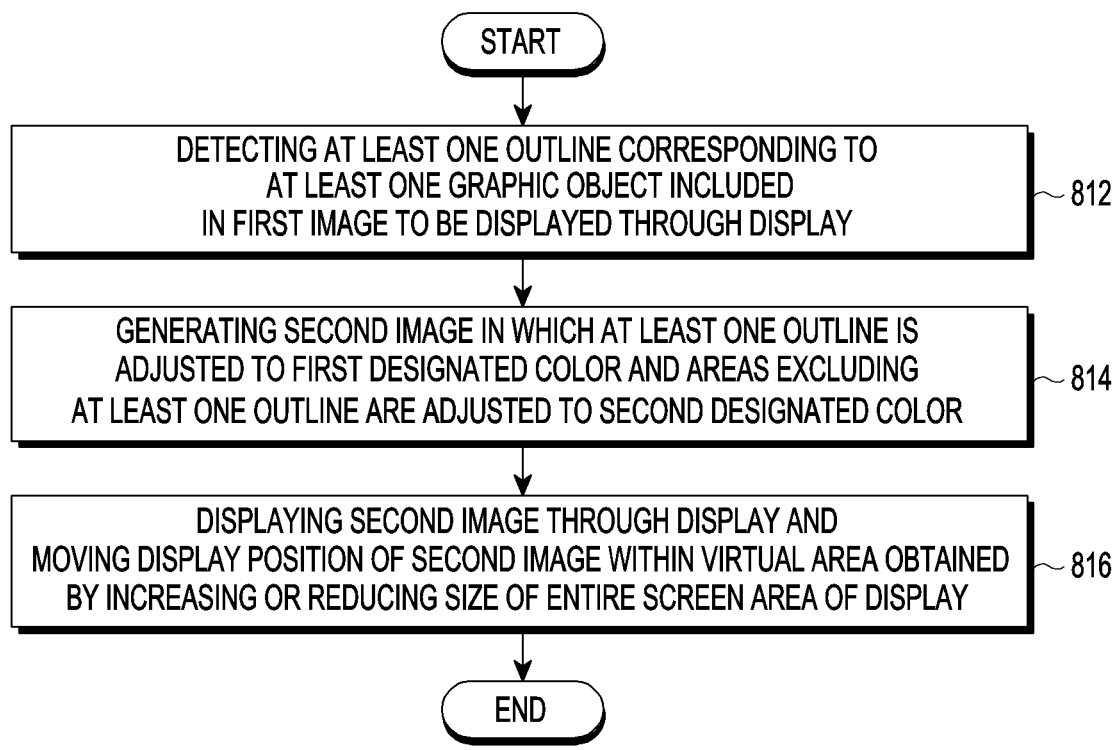
FIG. 8 is a flowchart illustrating operations of generating a second image without reducing the size a first image according to various embodiments.

FIG. 8 is a flowchart illustrating operations of generating a second image without reducing the size of a first image according to various embodiments.

Operations 812 to 818 according to various embodiments may be understood as operations performed by a processor (e.g., the processor 120 in FIG. 1 or the processor 410 in FIG. 4, and hereinafter, the processor 410 in FIG. 4 will be described as an example) of an electronic device (e.g., the electronic device 101 in FIG. 1 or the electronic device 400 in FIG. 4). According to one embodiment, at least one of the operations 812 to 816 may be omitted, the orders of some of the operations may be reversed, or another operation may be added.

According to various embodiments, in operation 812, the processor 410 may detect at least one outline corresponding to at least one graphic object included in the first image to be displayed through a display (e.g., the display device 160 in FIG. 1 or the display 430 in FIG. 4). According to one embodiment, the processor 410 may acquire a first image to be displayed on the display 430 by using at least one display data (for example, 712 or 714 in FIG. 7) associated with various applications and functions executed in the electronic device 400, and may detect at least one outline corresponding to at least one graphic object included in the first image by an image filter or an edge parameter to the first image. According to one embodiment, the image filter may include a Laplacian/Laplacian of Gaussian Filter. For example, the processor 410 may detect at least one outline having various sizes, colors, brightnesses, or saturations, based on the attributes (for example, size, color, brightness, saturation, or the like) of at least one graphic object included in the first image, by using the Laplacian/Laplacian of Gaussian Filter and/or the edge extraction parameter. According to various embodiments, each of at least one outline may have a different width according to the attributes of at least one graphic object, an image filter, and/or an edge extraction parameter. According to various embodiments, the processor 410 may adjust the width of at least one detected outline by adjusting an image filter parameter value or an edge extraction parameter value. For example, the processor 410 may cause the width of the at least one detected outline to narrow or widen over time, by adjusting the image filter parameter or edge extraction parameter value, based on the time at which a first image is displayed on the display 430. According to various embodiments, at least one graphic object may include icons, buttons, and the like, and may be a user interface object enabling a touch input by a user.

According to various embodiments, in operation 814, the processor 410 may generate a second image in which at least one outline is adjusted to a first designated color, and areas excluding the at least one outline are adjusted to a second designated color. According to one embodiment, the processor 410 may generate the second image by changing the at least one outline, corresponding to the at least one graphic object (for example, an image of various shapes including icons, buttons, letters, or numbers) included in a first image, to have a first designated color and changing the remaining areas excluding the at least one outline to have a second designated color. According to one embodiment, the processor 410 may also generate a third screen in which the first designated color of the at least one outline included in the second image is adjusted to a third designated color after a designated time interval. For example, the processor 410 may detect an outline of an icon having a specific color (a blue color) and may generate a second image in which the outline is adjusted to a first designated color, for example, a color (for example, red or green) of a pixel (for example, an R pixel or a G pixel) having a longer lifespan than that of the blue color and areas excluding the outline are adjusted to a second designated color (for example, an achromatic color, such as grey or black), so that a pixel having a longer lifespan than other pixels is used on the second image, thereby reducing the occurrence of burn-in.

According to various embodiments, in operation 816, the processor 410 may display the second image through the display 430 and may move the display position of the second image within a virtual area, for example, an increased area or a reduced area, obtained by increasing or reducing the size of the entire screen area of the display.

According to one embodiment, when the display position of the second image is moved within the increased area, an empty area in which no images are displayed may be generated in the entire screen area of the display, in proportion to a portion moved from the second image to the increased area. The processor 410 may display a color associated with the second image in the empty area of the entire screen area, in which no images are not displayed. According to one embodiment, when the display position of the second image is moved within the reduced area, a part of the second image as much as the reduced area of the entire screen area may not be displayed in the entire screen area.

According to various embodiments, the processor 410 may move, within the increased area or the reduced area, the display position of the second image at a designated time interval (for example, 0.01 seconds, 0.05 seconds, or 1 second) or a designated distance interval (for example, a distance of one of 1 to 4 pixels) or continuously up, down, leftwards, rightwards, or diagonally.

According to various embodiments, when an application function corresponding to the second screen is terminated or a new third image is displayed while the second image is displayed, or when a user input is received while the second image is displayed, the processor 410 may stop displaying or moving the second image on the display, and may display the first image on the entire screen of the display.

Figure 9A:
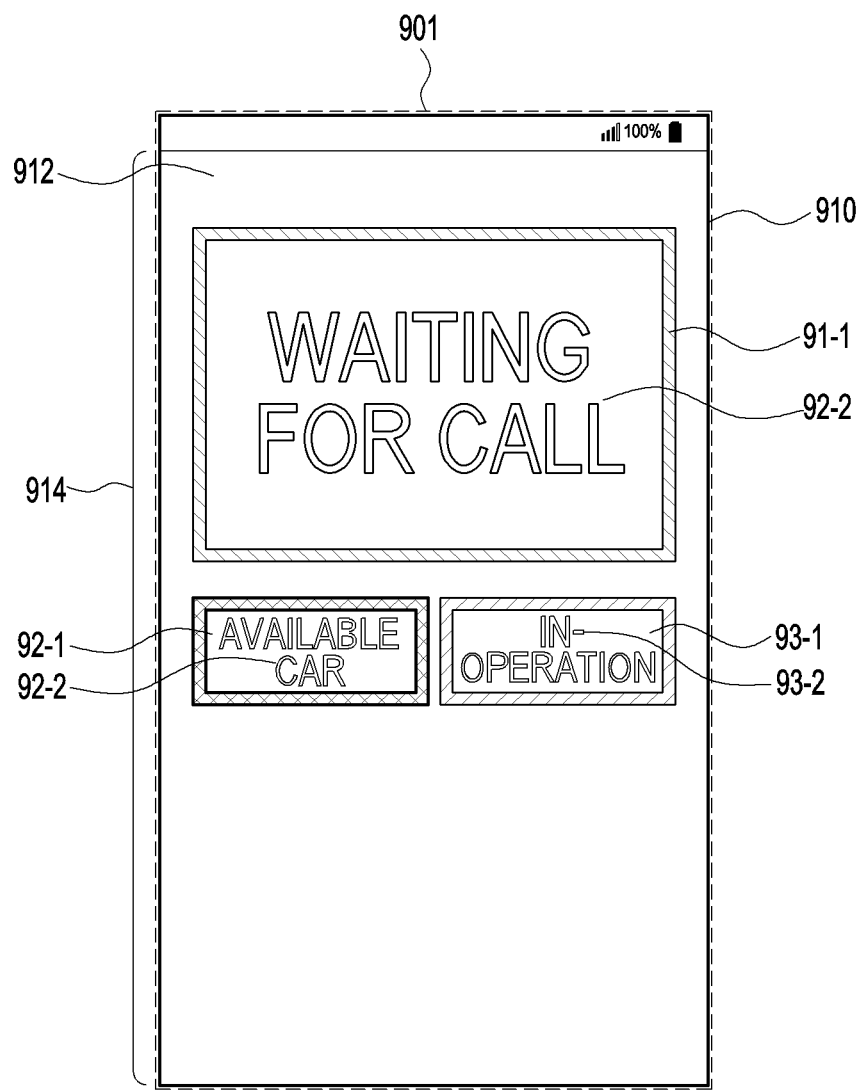
FIGS. 9A, 9B, and 9C illustrate examples of a screen for the case in which a second image generated without reducing the size of a first image to be displayed through a display is moved within a virtual area, according to various embodiments.
Figure 9B:
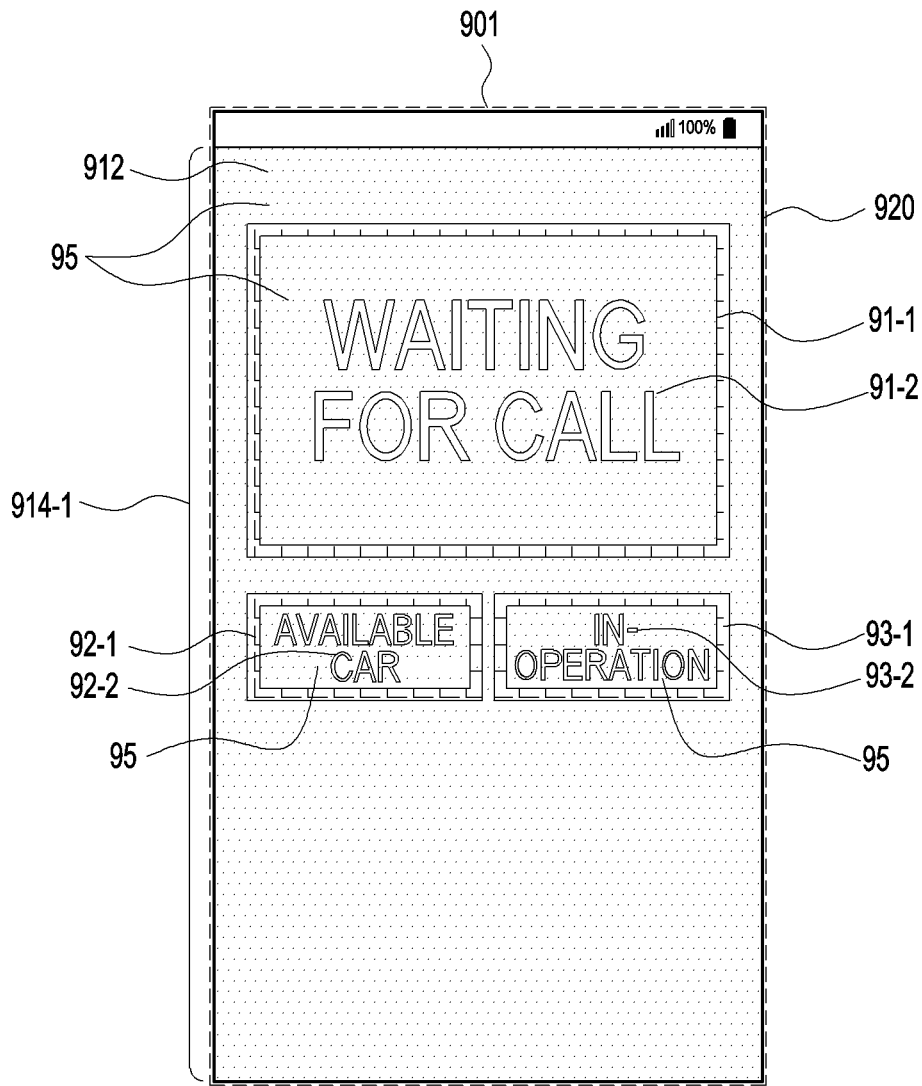
Figure 9C:
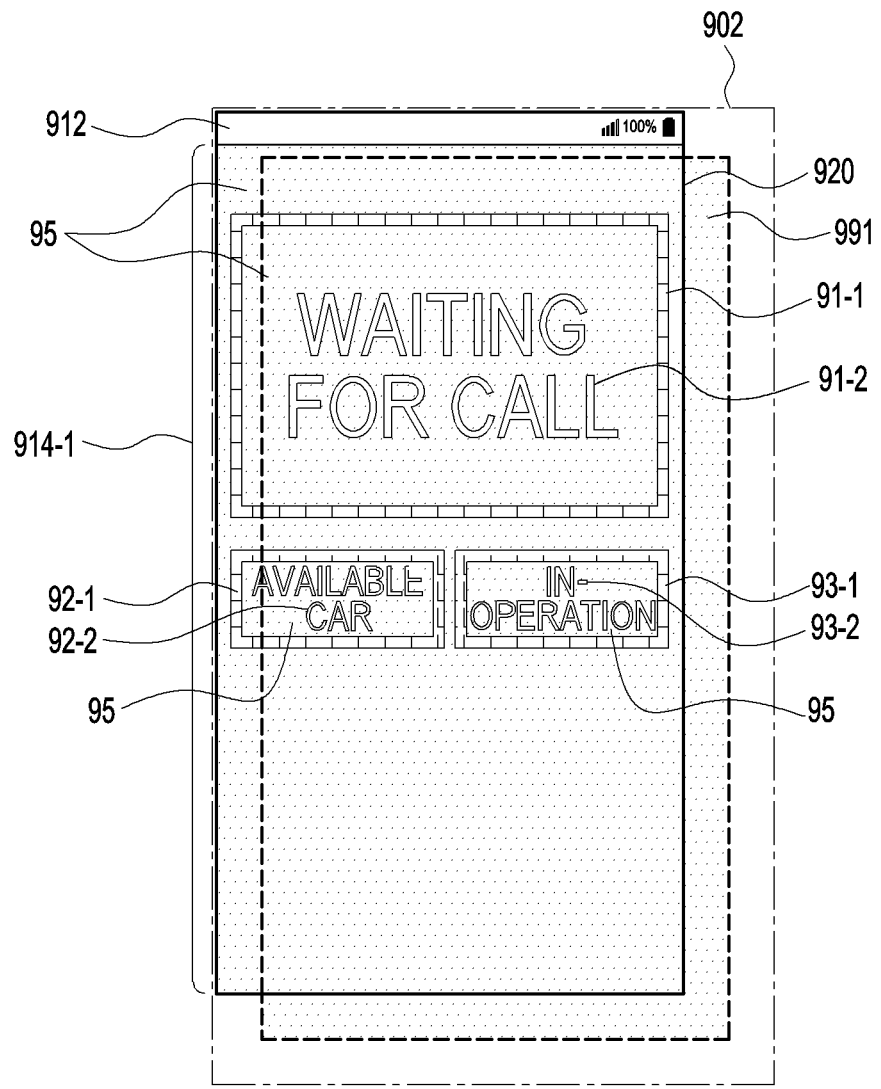

FIGS. 9A, 9B, and 9C illustrate examples of a screen for the case in which a second image generated without reducing the size of a first image to be displayed through a display is moved within a virtual area, according to various embodiments.

Referring to FIG. 9A, at least one outline 91-1, 91-2, 92-1, 92-2, 93-1, or 93-2 corresponding to at least one graphic object included in a first image 910 (e.g., the first image 710 of FIG. 7A) may be detected while the size of the first image 910 to be displayed on a display (e.g., the display device 160 in FIG. 1 or the display 430 in FIG. 4) according to various embodiments is the same as the size of an entire screen area 901 of the display. According to one embodiment, the at least one outline 91-1, 91-2, 92-1, 92-2, 93-1, or 93-2 corresponding to the at least one graphic object (for example, an image of various shapes including icons, buttons, letters, or numbers) may be detected in the first image 910 as an image filter (e.g., a Laplacian/Laplacian of Gaussian Filter) or an edge parameter is applied to the first image 910. For example, the at least one outline 91-1, 91-2, 92-1, 92-2, 93-1, or 93-2 may have a color the same as or similar to that of the at least one graphic object corresponding thereto.

Referring to FIG. 9B, a second image 920 in which a color of at least one detected outline 91-1, 91-2, 92-1, 92-2, 93-1, or 93-2 according to various embodiments is adjusted to a first designated color and areas 95 excluding the at least one outline are adjusted to a second designated color may be generated. According to one embodiment, the second image in which the at least one outline 91-1, 91-2, 92-1, 92-2, 93-1, or 93-2 is adjusted to a first designated color, for example, a color of a pixel having a relatively long lifespan and areas 95 excluding the at least one outline are adjusted to a second designated color (for example, an achromatic color, such as grey or black) may be generated to allow a pixel having a longer lifespan than other pixels to be used on the second image, so that the occurrence of burn-in may be reduced.

Referring to FIG. 9C, the display position of the second image 920 according to various embodiments may be moved within an increased area 902 obtained by increasing an entire screen area 901 of a display. According to various embodiments, the display position of the second image 920 may be moved at a designated time interval (for example, 0.01 seconds, 0.05 seconds, or 1 second) or a designated distance interval (for example, a distance of one of 1 to 4 pixels) or continuously up, down, leftwards, rightwards, or diagonally. According to various embodiments, the increased area 902 may be a virtual area having a size larger than that of the entire screen area 901 of the display, a part of the second image 920 may not be displayed through the display because the part of the second image may be included in the increased area 902 rather than the entire screen area 901 of the display while the second image 920 is moved within the increased area, and an empty area 99 as much as the part included in the increased area 902 may be generated in the entire screen area 901 of the display. According to various embodiments, the same color as the color included in the second image 920 may be displayed in the empty area 99.

According to various embodiments, the display position of the second image 920 may be moved within a reduced area 903 obtained by reducing the size of an entire screen area 901 of a display. According to various embodiments, the display position of the second image 920 may be moved at a designated time interval (for example, 0.01 seconds, 0.05 seconds, or 1 second) or a designated distance interval (for example, a distance of one of 1 to 4 pixels) or continuously up, down, leftwards, rightwards, or diagonally. According to various embodiments, the reduced area 903 may be a virtual area having a size smaller than that of the entire screen area 901 of the display, a part 992 of the second image 920 may deviate from the entire screen area 901 of the display while the second image 920 is moved within the reduced area. Thus, the part 992 of the second image 920 may not be displayed through the display and an empty area 993 as much as the reduced area may be generated in the entire screen area 901 of the display. According to various embodiments, the same color as the color included in the second image 920 may be displayed in the empty area 993.

Figure 10A:
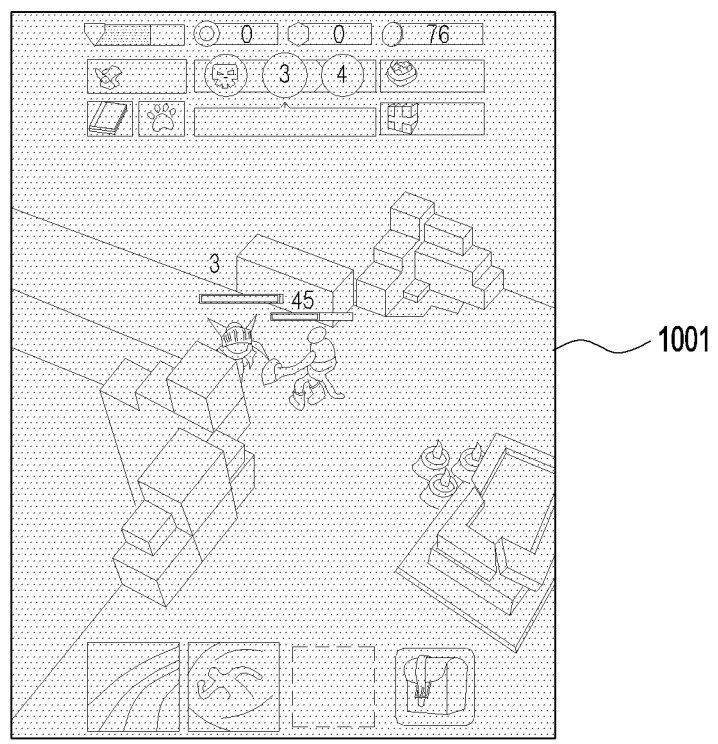
FIGS. 10A, 10B, and 10C illustrate examples of a first image and a second image according to various embodiments.
Figure 10B:
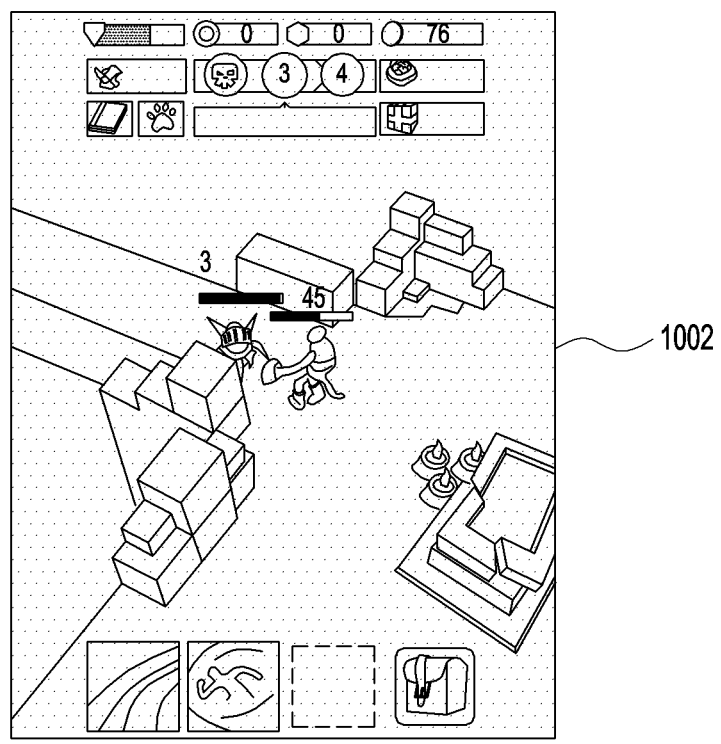
Figure 10C:
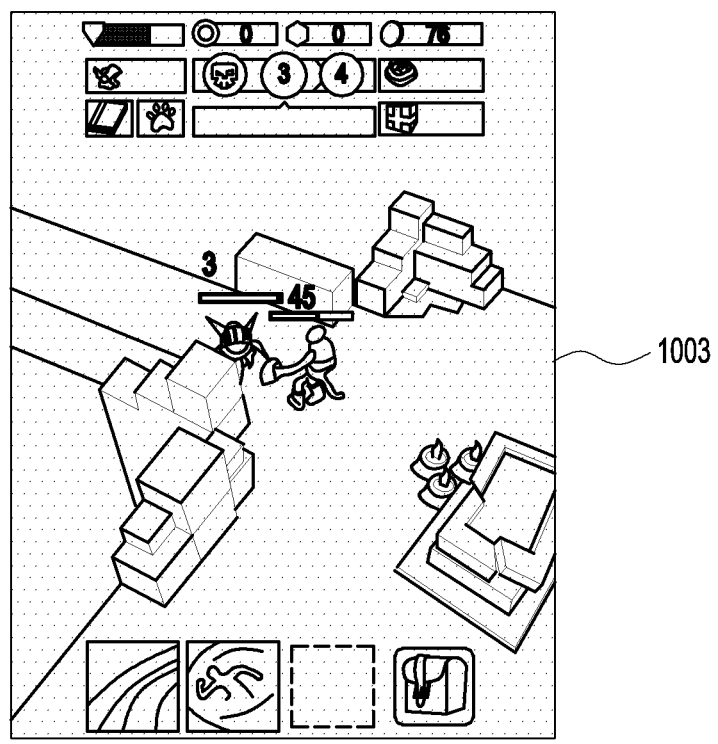

FIGS. 10A, 10B, and 10C illustrate examples of a first image and a second image according to various embodiments.

Referring to FIG. 10A, a first image according to various embodiments may include a first application screen image 1001. According to one embodiment, the first application screen image 1001 which includes a fixed graphic user interface (GUI) may be an image to be displayed for a designated time period or longer. For example, the first application screen image may be a game application screen image, and as a game application is operated in an auto mode, a fixed graphic user interface (GUI) and an unfixed GUI may be automatically displayed in the game application image even without an input by a user. For, example, the auto mode may be a mode in which the mode of the electronic device 100 is not switched to a sleep mode and a game application is automatically played, even without manipulation by a user. The fixed GUI may include non-moving menus, backgrounds, indicators, and the like, and when the fixed GUI is continuously displayed, a specific pixel for displaying the fixed GUI emits light continuously, unlike other pixels, and thus the lifespan of the specific pixel is reduced, whereby a burn-in phenomenon may occur.

Referring to FIG. 10B, when the first application screen image 1001 needs to be displayed continuously, a processor (e.g., the processor 120 in FIG. 1 or the processor 410 in FIG. 4) may move and display a second image 1002 by: detecting, in the first application screen image 1001, at least one outline corresponding to at least one graphic object corresponding to the fixed GUI; and generating the second image 1002 in which the at least one outline is adjusted to a first designated color and areas excluding the at least one outline are adjusted to a second designated color. Accordingly, a burn-in phenomenon occurring when a specific pixel for displaying the GUI emits light continuously, unlike other pixels, and thus the pixel life is shortened, may be reduced.

Referring to FIG. 10C, the processor (e.g., the processor 120 in FIG. 1 or the processor 410 in FIG. 4) may adjust the width of the at least one detected outline by adjusting an image filter parameter value or an edge extraction parameter value. For example, the processor may cause the width of the at least one detected outline to widen over time, by adjusting the edge extraction parameter value, based on the time at which the first application screen image 1001 is displayed on the display. Meanwhile, the processor may also cause the width of the at least one detected outline to narrow over time, by adjusting the edge extraction parameter value, based on the time at which the first application screen image 1001 is displayed on the display.

Each of the components described in this document may be composed of one or more components, and the name of the corresponding component may vary according to the type of electronic device. In various embodiments, the electronic device may be configured to include at least one of the components described in this document and may omit some components or further include additional components. In addition, some of the components of the electronic device according to various embodiments may be combined to form a single entity, and thus may equally perform the functions of the corresponding components before being combined.

As used herein, the term "module" may refer to a unit that includes one or a combination of two or more of hardware, software, or firmware. "Module" may be interchangeably used with terms such as, for example, "unit", "logic", "logical block", "component", or "circuit". The "module" may be a minimum unit or part of an integrally constructed part. The "module" may be a minimum unit performing one or more functions or part thereof. The "module" may be implemented mechanically or electronically. For example, the "module" may include at least one of application-specific integrated circuit (ASIC) chips, field-programmable gate arrays (FPGAs), or programmable-logic devices that perform certain operations, which have been known or will be developed in the future.

At least a part of an apparatus (e.g., modules or functions thereof) or a method (e.g., operations) according to various embodiments may be, for example, implemented as an instruction stored in computer-readable storage media in the form of a program module. When the instruction is executed by a processor (e.g., the processor 120), the one or more processors may perform a function corresponding to the instruction. The computer-readable storage media may be, for example, the memory 130.

According to various embodiments, in storage media storing instructions, the instructions are configured to cause one or more circuits to perform one or more operations when executed by one or more circuits, and the one or more operations may include: detecting at least one outline corresponding at least one graphic object included in a first image to be displayed on a display; generating a second image in which the at least one outline is adjusted to a first designated color, and areas excluding the at least one outline in the first image are adjusted to a second designated color; and displaying the second image using the display.

Computer-readable recording media may include hard disks, floppy disks, magnetic media (e.g., magnetic tapes), optical media (e.g., compact disc read only memory (CD-ROM)), and digital versatile discs (DVD), magneto-optical media (e.g. floptical disks), hardware devices (e.g. read only memory (ROM), random access memory (RAM), flash memory, or the like), and the like. In addition, program instructions may include not only machine code generated by a compiler, but also high-level language code executable by a computer using an interpreter, etc. The hardware device described above may be configured to operate as one or more software modules to perform operations of various embodiments, and vice versa.

Modules or program modules according to various embodiments may include at least one of the above components, omit some components, or further include other additional components. Operations performed by a module, a program module, or other components according to various embodiments may be executed in a sequential, parallel, repetitive, or heuristic manner. In addition, some operations may be executed in a different order or omitted, or other operations may be added.

The electronic device according to various embodiments of the disclosure described above is not limited to the above-described embodiments and drawings, and it will be apparent to those skilled in the art that various substitutions, modifications, and variations can be made within the technical scope of the disclosure.

The invention claimed is:

1. An electronic device comprising:
a display; and
a processor,
wherein the processor is configured to:
detect at least one outline corresponding to at least one graphic object included in a first image to be displayed through the display;
generate a second image in which the at least one outline is adjusted to a first designated color, and areas excluding the at least one outline in the first image are adjusted to a second designated color; and
display the second image by using the display, and
wherein the first designated color is a color based at least on a color of the at least one graphic object and the second designated color is an achromatic color.

2. The electronic device of claim 1, wherein the processor is configured to:
generate a third image in which the first designated color of the at least one outline included in the second image is adjusted to a third designated color; and
display the third image through the display.

3. The electronic device of claim 1, wherein the processor is configured to adjust a width of the at least one outline to a first designated width, as at least part of the generating the second image.

4. The electronic device of claim 3, wherein the processor is configured to:
generate a third image in which the at least one outline is adjusted to have a second designated width smaller than the first designated width; and
display the third image through the display.

5. The electronic device of claim 1, wherein the processor is configured to generate the second image having a size smaller than the size of the first image, as at least part of the generating the second image.

6. The electronic device of claim 5, wherein the processor is configured to:
display the second image at a first position on the display; and
display the second image at a second position on the display, based at least on a designated condition.

7. The electronic device of claim 6, wherein the processor is configured such that at least a part of the second image is not displayed through the display, based at least on the first position or the second position.

8. The electronic device of claim 6, wherein the processor is configured to:
identify a user input onto the first image while the second image is displayed at the second position on the display; and
perform a function corresponding to the user input.

9. The electronic device of claim 1, wherein the first image comprises an application screen image being executed in the electronic device, wherein the processor is configured to determine a second position for displaying the second image, based on a display condition associated with the application screen image.

10. The electronic device of claim 1, wherein the processor is configured to display the second image at a first position on the display when a designated condition is satisfied while the second image is displayed at a second position on the display.

11. The electronic device of claim 1, wherein the display is an organic light-emitting diode (OLED) display.

12. A method for preventing display burn-in in an electronic device comprising:
detecting at least one outline corresponding to at least one graphic object included in a first image to be displayed through a display;
generating a second image in which the at least one outline is adjusted to a first designated color, and areas excluding the at least one outline in the first image are adjusted to a second designated color; and
displaying the second image by using the display,
wherein the first designated color is a color based at least on a color of the at least one graphic object and the second designated color is an achromatic color.

13. The method of claim 12, further comprising:
generating a third image in which the first designated color of the at least one outline included in the second image is adjusted to a third designated color; and
displaying the third image through the display.

* * * * *